United States Patent
Zipin

[15] 3,658,429
[45] Apr. 25, 1972

[54] DISPLACEMENT MEASURING APPARATUS

[72] Inventor: Richard B. Zipin, Dayton, Ohio
[73] Assignee: The Bendix Corporation
[22] Filed: May 11, 1970
[21] Appl. No.: 36,201

[52] U.S. Cl. ..........................356/169, 33/125 A, 33/125 C, 73/105, 250/237 G, 350/162, 356/120
[51] Int. Cl. ........................................................G01b 11/04
[58] Field of Search............33/125 A, 125 C, 174 P, 174 PA, 33/174 PB, 137–140; 250/237 G, 219 I, 219 ID; 350/162; 73/105; 356/169, 170, 120, 156

[56] References Cited

UNITED STATES PATENTS

| | | | |
|---|---|---|---|
| 3,230,380 | 1/1966 | Cooke | 33/125 C |
| 3,245,307 | 4/1966 | De Lang | 250/219 ID |
| 2,295,000 | 9/1942 | Morse | 33/125 C |
| 3,558,861 | 1/1971 | Collins et al. | 250/219 D |

FOREIGN PATENTS OR APPLICATIONS

| | | | |
|---|---|---|---|
| 376,673 | 1964 | Switzerland | 33/125 C |

Primary Examiner—Ronald L. Wibert
Assistant Examiner—J. Rothenberg
Attorney—John R. Benefiel and Plante, Hartz, Smith and Thompson

[57] ABSTRACT

A displacement measuring device including a tape scribed or etched with a grating and arranged to be pulled out from a constant torque reel means by a telescoping measuring probe past a reading head designed to produce output signals corresponding to the relative movement of the tape grating and reading head to thereby yield output signals in response to the extension of the probe.

2 Claims, 1 Drawing Figure

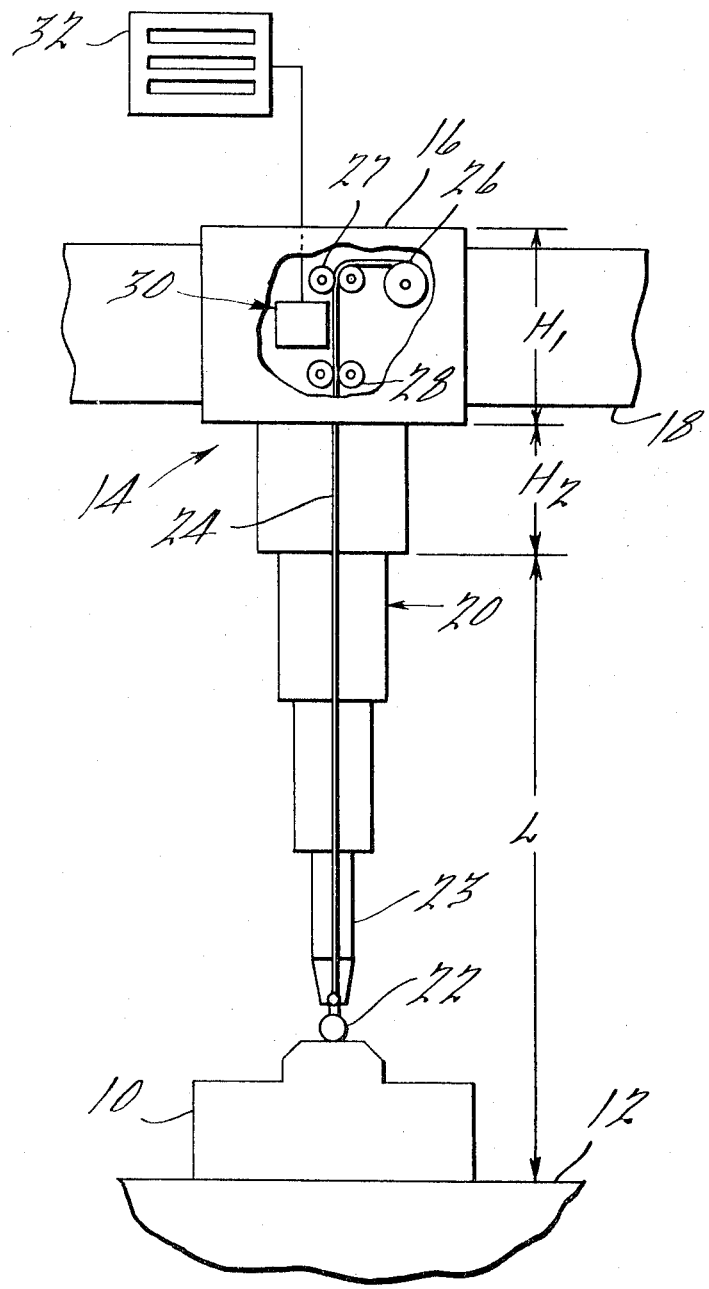

DISPLACEMENT MEASURING APPARATUS

BACKGROUND OF THE INVENTION

Precision measuring apparatus utilizing the electro-optic system disclosed in U.S. Pat. No. 2,886,717 and relying on the Moire fringe phenomenon has enjoyed great success inasmuch as this system has numerous and marked advantages over other such systems, i.e., great accuracy, freedom from the effects of wear, adaptability to digital control systems, etc. This apparatus involves the use of a pair of gratings, one mounted on a reading head, and the other mounted on a rigid spar member, with photocells and associated circuitry producing output signals whenever relative movement between the gratings occurred in a direction along the gratings in a manner now well known in the art. By fixing a measuring probe to the spar, movement of the probe could be precisely monitored to thus provide a highly accurate means of measuring distances.

This is the commonly used method for providing a Z-axis readout in such apparatus, while carriages and ways supporting the probe assembly are used with similar cooperating reading heads and spars connected thereto for the C and Y readouts.

However, in situations where relatively large distances in the Z-axis are to be measured and/or clearance in this particular direction is limited, the use of a rigid spar member creates a problem since when the spar is in the upper portion of its range, its unused length will necessarily extend above its point of support. A telescoping spar member would be impractical since the grating could not be fixed thereto.

Therefore, it is an object of the present invention to provide an arrangement for utilizing the electro-optic system disclosed in the referenced U.S. patent without requiring excessive clearance along the direction of the measurements.

SUMMARY OF THE INVENTION

This object and others which will become apparent upon a reading of the following specification and claims are accomplished by providing a flexible tape upon which one of the gratings is scribed or etched and which is pulled from a constant wind up torque reel and advanced past a reading head by means of a connection with the tip of a telescoping spar carrying the measuring probe.

BRIEF DESCRIPTION OF THE DRAWING

The FIGURE is an elevational view in partial section of an arrangement according to the present invention.

DETAILED DESCRIPTION

In the following detailed description certain specific terminology will be utilized for the sake of clarity and a specific embodiment will be described in order to provide a better understanding of the invention, but it is to be understood that the invention is not so limited, and may be practiced in a variety of forms and embodiments.

Referring to the FIGURE, a workpiece 10 to be measured is mounted on a bed 12. Supported overhead is a measuring apparatus 14. This apparatus 14 is shown as providing Z-axis measurements, while the X and Y axis measurements may be carried out by mounting the Z-axis apparatus 14 on cross directed carriages and ways (not shown), the displacement of which being measured by rigid spars and cooperating reading heads connected thereto in the conventional manner.

The apparatus 14 includes a housing 16 supported on an overhead member 18 of the measuring machine, which in turn supports a telescoping spar 20 shown in the extended position, and having a probe 22 secured to the last section 23. Drivingly secured to the probe 22 is a length of flexible tape 24, which is fed from a constant wind up torque reel 26. The constant torque could be provided with a D.C. torque motor, a constant torque spring, or other suitable means to cause the tape to be fed out and retracted with corresponding movement of the probe 22.

This tape 24 is scribed or etched with precision gratings and inasmuch as stainless steel tape suitable for this purpose is commercially available for securing to rigid spars, it is not felt necessary to describe it in detail.

It is then passed between sets of rollers 27 and 28 designed to position the segment passing therebetween in the proper plane for reading by a Moire fringe reading head 30 positioned therebetween. As the probe 22 is extended or retracted, the tape 24 passes out of the relatively stationary constant torque reel 26 upwardly or downwardly past the reading head 30, which produces output signals in response thereto. These signals are used to activate a display device 32, which provides a readout of the precise position of the probe 22.

The overhead clearance required for this arrangement is equal to the sum of $H_1$, which is the vertical dimension of the housing 16, and $H_2$ which is the collapsed height of the telescoping spar, plus the range L of the probe. By comparison, conventional rigid spar arrangements would normally be at least equal to $H_1 + 2L$, and usually would be somewhat longer since the spar is normally longer than the range L. For increasing values of L, the disparity would normally become greater, so that for large range measuring machines the net reduction in overhead clearance will become substantial.

This reduction has been accomplished without sacrificing the advantages of the Moire fringe electro-optic system or using other less desirable devices.

What is claimed is:

1. Measuring apparatus for determining the displacement of a probe comprising:
    a flexible tape having an optical grating formed thereon;
    a Moire fringe reading head including means to produce electrical output signals in response to displacement of said grating past said reading head; feed means for producing corresponding movement of said tape past said head in response to displacement of said probe along at least one measuring direction, wherein said feed means includes a connection between said probe and one end of said flexible tape and windup reel means attached to the other end of said flexible tape; and
    a telescoping support for said probe, whereby output signals are produced by said reading head corresponding to said probe displacement.

2. The apparatus of claim 1 wherein said reel means includes a constant tension reel member relatively stationary with respect to said probe.

* * * * *